United States Patent [19]

Nakano et al.

[11] Patent Number: 5,763,088

[45] Date of Patent: Jun. 9, 1998

[54] OLEFIN RESIN-BASED ARTICLES HAVING GAS BARRIER PROPERTIES

[75] Inventors: Tomomi Nakano; Masayuki Egami; Masafumi Hattori; Akira Mizuno; Junji Mayumi, all of Mie, Japan

[73] Assignee: Mitsubishi Chemical Corporation, Tokyo, Japan

[21] Appl. No.: 583,859

[22] Filed: Jan. 11, 1996

Related U.S. Application Data

[63] Continuation of Ser. No. 229,634, Apr. 19, 1994, abandoned.

[30] Foreign Application Priority Data

Sep. 21, 1993 [JP] Japan ............................ 5-234806
Apr. 27, 1996 [JP] Japan ............................ 5-101002

[51] Int. Cl.$^6$ ............................ B32B 27/06; B32B 27/32
[52] U.S. Cl. ............................ 428/424.8; 428/423.1; 428/424.2; 428/425.5; 428/451; 428/446; 428/483
[58] Field of Search ............................ 428/446, 451, 428/483, 423.1, 424.2, 424.8, 425.5; 525/285

[56] References Cited

U.S. PATENT DOCUMENTS

| | | | |
|---|---|---|---|
| 4,440,911 | 4/1984 | Inoue et al. | 525/301 |
| 4,506,056 | 3/1985 | Gaylord | 524/445 |
| 4,528,234 | 7/1985 | Kaiho et al. | 428/216 |
| 4,684,553 | 8/1987 | Sasaki et al. | 428/35.7 |
| 5,279,873 | 1/1994 | Oike | 428/35.4 |

FOREIGN PATENT DOCUMENTS

A-0 566 053 10/1993 European Pat. Off. .
A-1 338 715 11/1973 United Kingdom .

OTHER PUBLICATIONS

Database WPI, Derwent Publications Ltd., London, GB; AN 83-731544[32] & JP-A-58 110 242 (Toyo Ink Mfg. KK.) 24, Dec., 1981 *abstract*.

*Primary Examiner*—Mark L. Warzel
*Attorney, Agent, or Firm*—Oblon, Spivak, McClelland, Maier & Neustadt, P.C.

[57] ABSTRACT

An olefin resin-based article having good gas barrier properties is disclosed, comprising an $\alpha,\beta$-ethylenically unsaturated carboxylic acid-grafted polyolefin (e.g., maleic anhydride-grafted polypropylene) having formed thereon an inorganic oxide deposite film, wherein the grafted polyolefin has an unsaturated carboxylic acid unit concentration of from 0.01 to 10% by weight, with or without an anchor coat being provided between the grafted polyolefin and the inorganic oxide film. The article suffers from no reduction in gas barrier properties even when heat or stress is applied thereto and is therefore useful as a wrapping or packaging material in the production of pouch-packed foods and IC packages.

24 Claims, 1 Drawing Sheet

OLEFIN RESIN-BASED ARTICLES HAVING GAS BARRIER PROPERTIES

This application is a continuation of application Ser. No. 08/229,634, filed on Apr. 19, 1994, now abandoned.

FIELD OF THE INVENTION

This invention relates to an olefin resin-based article having excellent gas barrier properties which is useful in packaging applications, such as in the protection of foods and electronic components.

BACKGROUND OF THE INVENTION

The packaging of foods, electronic components, and other oxygen sensitive entities in a film or a container which suppresses oxygen permeation has been proposed for protecting the packaged contents from oxidation, thereby maintaining the quality of the contents for a prolonged period of time.

For example, JP-B-53-12953 (the term "JP-B" as used herein means an "examined published Japanese patent application") and JP-A-4-353532 (the term "JP-A" as used herein means an "unexamined published Japanese patent application") disclose a transparent flexible plastic film with a low permeability to gases and moisture. This film is made of a flexible plastic film, such as polyethylene terephthalate, cellophane, nylon, polypropylene or polyethylene, having a thickness of from 5 to 300 μm and a transparent thin layer of a silicon compound represented by the general formula $Si_xO_y$ (wherein x is 1 or 2; and y is 0, 1, 2 or 3) formed on at least one side thereof in a thickness of from 100 to 3,000 Å.

JP-A-63-237940 discloses a transparent film having gas barrier properties made from the above-mentioned flexible plastic film with a metal oxide layer on at least one side thereof. The metal oxide layer comprises an oxide of at least one metal selected from the group consisting of In, Sn, Zn, Zr and Ti and is formed by sputtering. Additionally, a transparent heat-sealable resin film is provided thereon. Further, JP-A-3-218828 discloses a packaging material made from a low molecular weight polypropylene film with an $SiO_2$ deposite layer on at least one side thereof.

When a film material made of a resin which has a polar group, such as a hydroxyl group, a carboxyl group or an amino group, therein, for example, polyethylene terephthalate, nylon or cellophane, is used in the above products, sufficient adhesion to the inorganic oxide films (i.e., the $Si_xO_y$ and metal oxide layers) is obtained and the gas barrier properties provided are satisfactory, showing an oxygen permeability of from 0.5 to 8 cc/m²·atm·day.

When the above-mentioned inorganic oxides are deposited on the surface of a resin-based article comprising a non-polar olefin resin, such as polypropylene or polyethylene resins having an oxygen permeability of from 1,800 to 3,000 cc/m²·atm·day, the gas barrier properties can be increased to an oxygen permeability of from 5 to 40 cc/m²·atm·day. However, the inorganic oxide layers tend to become easily detached from the olefin resin upon the application of external stress or heat to the article. This detachment is primarily due to inadequate adhesion between the non-polar resin-based article and the deposited inorganic oxide. Such a situation occurs particularly in cases where a heat sealable layer is laminated on the oxide-coated non-polar resin article, when the laminated article (having a heat sealable layer) is fabricated into final form for bag making or cover sealing, when the bag is used, when the container made of the film is filled, or when the container and contents are sterilized, such as in the production of pouch-packed foods. When detachment of the oxide layer occurs, the oxygen permeability increases to 200 to 400 cc/m²·atm·day, and the practical utility of the article is severely decreased.

SUMMARY OF THE INVENTION

An object of the present invention is to provide a resin-based article having good gas barrier properties comprising an olefin resin-based article having an inorganic oxide deposited thereon, wherein the inorganic oxide deposit is prevented from detachment during fabrication or use, thereby maintaining good gas barrier properties.

The present invention provides an olefin resin-based article having good gas barrier properties which comprises an article of an α,β-ethylenically unsaturated carboxylic acid-grafted polyolefin (hereinafter referred to as a modified polyolefin) having formed thereon an inorganic oxide deposit film, wherein the modified polyolefin has an unsaturated carboxylic acid unit concentration of from 0.01 to 10% by weight.

In the present invention, the modified polyolefin exhibits firm adhesion to the inorganic oxide deposit film owing to its carboxyl group (—COOH).

In preferred embodiments of the present invention, an anchor coat is provided between the modified polyolefin and the inorganic oxide deposit film. According to this embodiment, the adhesion between the modified polyolefin and the inorganic oxide deposit film is enhanced by both the carboxyl group of the modified polyolefin and the anchoring effect of the anchor coat. When the inorganic oxide deposited on the modified polyolefin has a thickness of from 50 to 400 Å, the deposit film is so dense that the gas barrier properties are greatly improved.

DETAILED DESCRIPTION OF THE INVENTION

Figure 1:
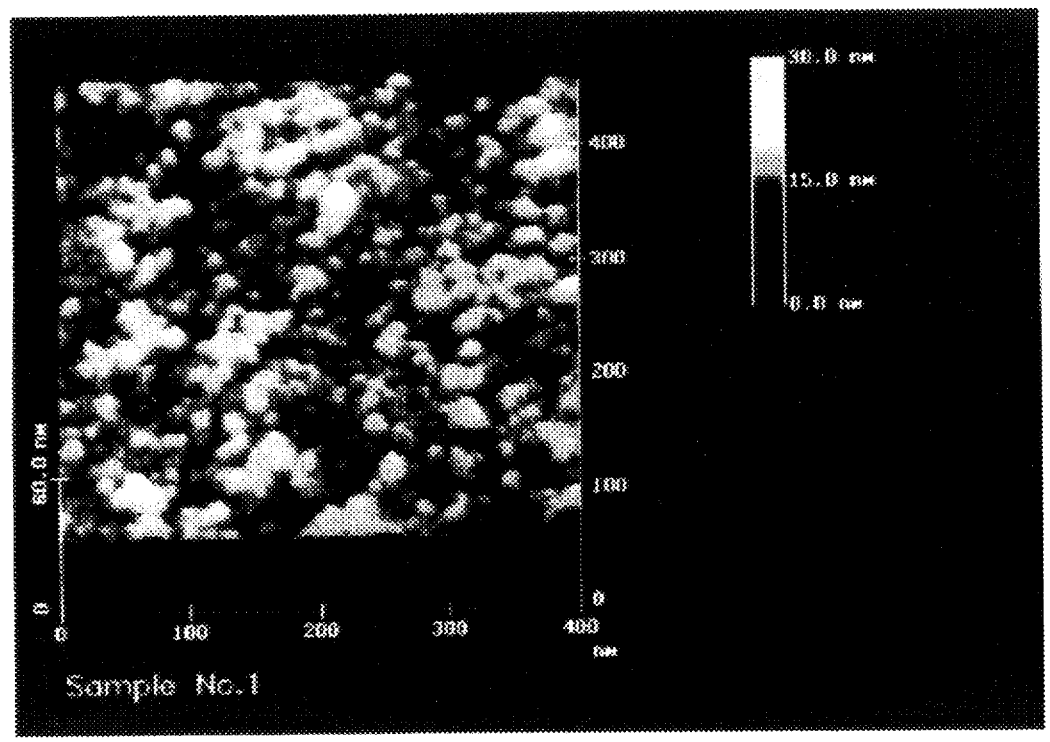
FIG. 1 is a photomicrograph of the surface of an $SiO_2$ thin layer deposited in Example 1 which was taken through an electron microscope of 250,000 magnifications.

The modified olefin resin which can be used in the present invention as a base material is obtained by graft polymerization of an unsaturated carboxylic acid (inclusive of an anhydride thereof) to an olefin resin. Graft polymerization can be carried out, for example, by a process comprising melt-kneading an olefin resin, an α,β-ethylenically unsaturated carboxylic acid monomer, and a catalyst in an extruder (see JP-B-43-27421 and JP-B-59-15127) or by a process comprising adding an α,β-ethylenically unsaturated carboxylic acid monomer and a catalyst, e.g., benzoyl peroxide or t-butyl perbenzoate, to an olefin dissolved in an appropriate solvent, e.g., toluene or xylene, and heating the mixture with stirring (see JP-B-44-15422 and JP-B-52-30546 both incorporated herein by reference). Any graft polymerization method known in the art can be used to produce the invention modified olefin resin.

The starting olefin resins include any homopolymer of an α-olefin having from 2 to 8 carbon atoms, e.g., ethylene, propylene, butene-1, pentene-1 or octene-1; ethylene copolymers with $C_3$–$C_8$ α-olefins, e.g., an ethylene-propylene copolymer, an ethylene-butene-1 copolymer, and an ethylene-hexene-1 copolymer; propylene copolymers with $C_2$–$C_8$ α-olefins, e.g., a propylene-butene-1 copolymer, a propylene-ethylene-butene-1 copolymer, and a propylene-4-methylpentene-1 copolymer; butene-1 copolymers with $C_2$–$C_8$ α-olefins, e.g., a butene-1-ethylene copolymer and a butene-1-propylene copolymer; and double bond-containing crystalline olefin copolymers comprising ethylene or an α-olefin having from 3 to 12 carbon atoms, preferably from 3 to 8 carbon atoms, and a diene having from 4 to 20 carbon atoms, preferably from 7 to 12 carbon atoms, having a diene unit concentration of from 0.05 to 20 mol %, preferably from 1 to 10 mol %, a modulus of elasticity (JIS K-7203) of from 2,000 to 45,000 kg/cm², preferably from 5,000 to 25,000 kg/cm², and a degree of crystallinity of 20% or more, preferably from 25% to 70%. These olefin resins may be used either individually or in combination of two or more thereof.

Of these olefin resins, a propylene homopolymer and a double bond-containing crystalline olefin copolymer are preferred from the standpoint of transparency. In particular, a double bond-containing crystalline olefin copolymer is preferred because of its ethylenically unsaturated bond (carbon-carbon double bond). The ethylenically unsaturated bond can be broken by oxidation pretreatment, such as sputtering, plasma treatment or chemical treatment, prior to deposition of the inorganic oxide to generate a carboxyl group or a carbonyl group on the surface of the resin molded article. Thus, the adhesion between the modified polyolefin and the inorganic oxide deposit film is further improved.

The crystalline olefin copolymer having such an unsaturated bond should have a sufficient molecular weight and/or melting point and glass transition point to be called a resin. To this effect, the crystalline olefin copolymer should have a number average molecular weight of at least 3,000 and a melting point and/or a glass transition point of not lower than 40° C., preferably between 80° and 187° C., and more preferably between 120° and 174° C.

The ethylene or the α-olefin having 3 to 12 carbon atoms, components of the crystalline olefin copolymer resin preferably include ethylene, propylene, 1-butene, 1-hexene, 3-methyl-1-butene, 3-methyl-1-pentene, 4-methyl-1-pentene, 3,3-dimethyl-1-butene, 4,4-dimethyl-1-pentene, 3-methyl-1-hexene, 4-methyl-1-hexene, 4,4-dimethyl-1-hexene, 5-methyl-1-hexene, allylcyclopentane, allylcyclohexane, allylbenzene, 3-cyclohexyl-1-butene, vinylcyclopropane, vinylcyclohexane, and 2-vinylbicyclo[2,2,1]heptane. Preferred of them are ethylene, propylene, 1-butene, 1-hexene, 3-methyl-1-butene, 3-methyl-1-pentene, 4-methyl-1-pentene, and 3-methyl-1-hexene.

These olefin monomers may be used either individually or in combination of two or more thereof. In particular, propylene or a combination of propylene with at least one of ethylene, 1-butene, 4-methyl-1-pentene, and 3-methyl-1-butene is preferred. When using two or more α-olefins in combination, the α-olefins may be distributed randomly or in blocks.

The crystalline olefin copolymer preferably has a diene unit concentration of from 0.05 to 20 mol %, preferably from 1 to 10 mol %, and more preferably from 0.5 to 15 mol %. When the diene unit concentration is less than 0.05 mol %, the unsaturated group (double bond) content in the copolymer is insufficient to manifest adequate adhesion to an inorganic oxide film. If it exceeds 20 mol %, the resulting crystalline olefin copolymer has reduced bending strength and reduced transparency.

The molecular weight of the crystalline olefin copolymer must be sufficient to maintain a resinous state, as previously described. For example, a molecular weight of a copolymer predominantly comprising propylene as an α-olefin to maintain a resinous state corresponds to a melt flow rate (MFR) of from 0.01 to 100 g/10 min, and preferably from 0.02 to 50 g/10 min, as measured in accordance with JIS K 6758 (230° C., 2.16 kg load).

The diene monomers which can be copolymerized with the above-mentioned olefin monomers to produce the crystalline olefin copolymers of the invention include conjugated dienes having from 4 to 20 carbon atoms, preferably from 6 to 10 carbon atoms, acylic or cyclic non-conjugated dienes having from 4 to 20 carbon atoms, preferably from 6 to 14 carbon atoms, and mixtures thereof.

Specific examples of the conjugated dienes include 1,3-dienes, such as 1,3-butadiene, isoprene, 1,3-pentadiene, 1,3-hexadiene, 2,4-hexadiene, 2-methyl-1,3-pentadiene, 3-methyl-1,3-pentadiene, 4-methyl-1,3-pentadiene, 2,3-dimethyl-1,3-butadiene, 2,4-heptadiene, 3,4-dimethyl-1,3-pentadiene, 4-methyl-1,3-hexadiene, 5-methyl-1,3-hexadiene, 2,4-dimethyl-1,3-pentadiene, 4-ethyl-1,3-hexadiene, 7-methyl-3-methylene-1,6-octadiene (myrcene), 1-phenyl-1,3-butadiene, 4-phenyl-1,3-pentadiene, and 1,4-diphenyl-1,3-butadiene; and dialkenylbenzenes, such as divinylbenzene, isopropenylstyrene, divinyltoluene, divinylnaphthalene, and 1-phenyl-1-(4-vinylphenyl)ethylene.

The acyclic non-conjugated dienes useful in the present invention include those represented by formula (I):

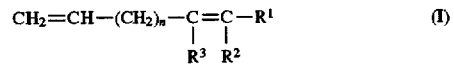

wherein n represents an integer of from 1 to 10; and $R^1$, $R^2$, and $R^3$ each independently represents a hydrogen atom or an alkyl group having from 1 to 8 carbon atoms.

Preferred acyclic non-conjugated dienes of formula (I) are those wherein n is 1 to 5; and $R^1$, $R^2$, and $R^3$ each is a hydrogen atom or an alkyl group having from 1 to 4 carbon atoms, provided that $R^1$, $R^2$, and $R^3$ do not simultaneously represent a hydrogen atom. More preferred are those wherein n is 1 to 3; $R^1$ is an alkyl group having 1 to 3 carbon atoms; and $R^2$ and $R3$ each is a hydrogen atom or an alkyl group having 1 to 3 carbon atoms, provided that $R^2$ and $R^3$ do not simultaneously represent a hydrogen atom.

Preferred examples of such acyclic non-conjugated dienes include acyclic 1,4-dienes, such as 2-methyl-1,4-pentadiene, 4-methylidene-1-hexane, 1,4-hexadiene, 4-methyl-1,4-hexadiene, 5-methyl-1,4-hexadiene, 1,4-heptadiene, 4-ethyl-1,4-hexadiene, 4,5-dimethyl-1,4-hexadiene, 4-methyl-1,4-heptadiene, 4-ethyl-1,4-heptadiene, 5-methyl-1,4-heptadiene, and 5-methyl-1,4-octadiene; acyclic 1,5-dienes, such as 1,5-heptadiene, 1,5-octadiene, 5-methyl-1,5-heptadiene, 6-methyl-1,5-heptadiene, and 2-methyl-1,5-hexadiene; acyclic 1,6-dienes, such as 1,6-octadiene, 6-methyl-1,6-octadiene, 7-methyl-1,6-octadiene, 2-methyl-1,6-heptadiene, 6-methylidene-1-octene, 6-ethyl-1,6-octadiene, 6,7-dimethyl-1,6-octadiene, 1,6-nonadiene, 6-ethyl-1,6-nonadiene, 7-methyl-1,6-nonadiene, and 7-methyl-1,6-decadiene; acyclic 1,7-dienes, such as 1,7-nonadiene, 7-methyl-1,7-nonadiene, 8-methyl-1,7-nonadiene, and 2-methyl-1,7-octadiene; and acyclic 1,8-dienes, such as 8-methyl-1,8-decadiene and 9-methyl-1,8-decadiene.

Suitable cyclic non-conjugated dienes include alkenylnorbornenes, such as cyclohexadiene, dicyclopentadiene, methyltetrahydroindene, and 5-vinyl-2-norbornene; alkylidenenorbornenes, such as 5-ethylidene-2-norbornene, 5-methylene-2-norbornene, and 5-isopropylidene-2-norbornene; and alkenylcyclohexenes, such as 6-chloromethyl-5-isopropenyl-2-norbornene, norbornadiene, and 4-vinylcyclohexene.

Preferred dienes for use in the copolymer of the present invention are $C_6$–$C_{14}$ acyclic non-conjugated dienes and dialkenylbenzenes, with 4-methyl-1,4-hexadiene, 5-methyl-1,4-hexadiene, 6-methyl-1,6-octadiene, 7-methyl-1,6-octadiene, 1,13-tetradecadiene, 9-methyl-1,8-decadiene, isopropenyl-styrene, and divinylbenzene being most preferred.

The diene monomers may be incorporated into the copolymer of the present invention either individually or in combination of two or more thereof. For example, a combination of 4-methyl-1,4-hexadiene and 5-methyl-1,4-hexadiene in a weight ratio of from 95:5 to 5:95 may be suitably used. Commercially available crude divinylbenzene, which is actually an isomeric mixture of m-divinylbenzene and p-divinylbenzene containing ethylvinylbenzene, diethylbenzene, etc., may be utilized without purification.

The crystalline olefin copolymer can be prepared by copolymerizing ethylene or an α-olefin and a diene in the presence of a conventional Ziegler-Natta catalyst used in α-olefin polymerization in a conventional manner with a conventional apparatus. Any art-known method can be used. The diene compound may be distributed in the olefin copolymer resin either at random or in blocks.

The terminology "block copolymer" as hereinafter used has the following meanings. To take an instance, a "block copolymer comprising homopolymer blocks of monomer A and random copolymer blocks of monomers A and B" includes not only a block copolymer which is built up through chemical bonding of homopolymer blocks of monomer A and random copolymer blocks of monomers A and B to form a structure of A•••A-AABABAAAAB••• but a blend of polymers containing (i) a copolymer built up through chemical bonding of homopolymer blocks of monomer A and random copolymer blocks of monomers A and B and (ii) a homopolymer of monomer A, (iii) a random copolymer of monomers A and B or a combination of (ii) and (iii).

Similarly, a "block copolymer comprising polymer blocks a and b" includes not only polymers with blocks a and b chemically bonded to each other but a polymer blend containing (i) a block copolymer comprising chemically bound polymer blocks a and b, and (ii) a polymer solely comprising polymer blocks a and/or (iii) a polymer solely comprising polymer blocks b.

Therefore, the terminology "block copolymer" has the same meaning as when referring to polymers synthesized with a Ziegler-Natta catalyst.

Specific and preferred examples of the crystalline olefin copolymer include (1) a propylene/4-methyl-1,4-hexadiene/ 5-methyl-1,4-hexadiene random copolymer, (2) a block copolymer comprising propylene homopolymer blocks and ethylene/4-methyl-1,4-hexadiene/5-methyl-1,4-hexadiene random copolymer blocks, (3) an ethylene/4-methyl-1,4-hexadiene/5-methyl-1,4-hexadiene random copolymer, (4) a propylene/ethylene/4-methyl-1,4-hexadiene/5-methyl-1,4-hexadiene random copolymer, (5) a block copolymer comprising ethylene/4-methyl-1,4-hexadiene/5-methyl-1,4-hexadiene random copolymer blocks and propylene/4-methyl-1,4-hexadiene/5-methyl-1,4-hexadiene random copolymer blocks, (6) a propylene/7-methyl-1,6-octadiene random copolymer, (7) a block copolymer comprising propylene homopolymer blocks and ethylene/propylene/7-methyl-1,6-octadiene random copolymer blocks, (8) a block copolymer comprising propylene homopolymer blocks and propylene/7-methyl-1,6-octadiene random copolymer blocks, (9) an ethylene/propylene/7-methyl-1,6-octadiene random copolymer, (10) a block copolymer comprising ethylene/propylene random copolymer blocks and propylene/7-methyl-1,6-octadiene random copolymer blocks, (11) a block copolymer comprising ethylene/propylene random copolymer blocks and ethylene/propylene/7-methyl-1,6-octadiene random copolymer blocks, (12) a 3-methyl-1-butene/7-methyl-1,6-octadiene random copolymer, (13) a propylene/divinylbenzene random copolymer, (14) an ethylene/divinylbenzene random copolymer, (15) a propylene/ethylene/divinylbenzene random copolymer, (16) a block copolymer comprising propylene homopolymer blocks and ethylene/divinylbenzene random copolymer blocks, (17) a block copolymer comprising propylene homopolymer blocks and propylene/ethylene/ divinylbenzene random copolymer blocks, (18) a block copolymer comprising propylene/divinylbenzene random copolymer blocks and ethylene/divinylbenzene random copolymer blocks, (19) a block copolymer comprising propylene/divinylbenzene random copolymer blocks and propylene/ethylene/divinylbenzene random copolymer blocks, and (20) a 3-methyl-1-butene/divinylbenzene random copolymer.

The crystalline olefin copolymer may be diluted with polypropylene, polyethylene, a propylene/ethylene copolymer, an ethylene/butene-1 copolymer, an ethylene/ octene-1 copolymer, an ethylene/hexane-1 copolymer, a propylene/butene-1 copolymer, a propylene/ethylene/ butene-1 copolymer, a propylene/4-methylpentene-1 copolymer, or similar polymers. This being the case, however, the resultant resin mixture should contain $1\times10^{-4}$ to $2\times10^{-2}$ carbon-to-carbon double bond per 100 g of total resin.

The α,β-unsaturated carboxylic acid which is to be grafted to the olefin resin (i.e., the α-olefin homopolymers, α-olefin copolymers and double bond-containing crystalline olefin copolymers) includes acrylic acid, maleic acid, fumaric acid, itaconic acid, hymic acid, and their anhydrides, with maleic anhydride being preferred.

If desired, the modified olefin resin may be diluted with an unmodified olefin resin until the unsaturated carboxylic acid unit concentration of the diluted resin falls within the range of from 0.01 to 10% by weight, and preferably from 0.1 to 5% by weight. If the unsaturated carboxylic acid unit concentration is less than 0.01% by weight, sufficient adhesion to an inorganic oxide film cannot be obtained. If it exceeds 10% by weight, no further improvement in adhesion is produced. Besides, a polypropylene-based resin tends to undergo degradation, and a polyethylene-based resin tends to undergo crosslinking. It will follow that the polypropylene-based resin has an increased proportion of low-molecular weight components, resulting in a reduction of bonding power and that the polyethylene-based resin has too high a gel content to provide a stretchable film.

The modified olefin resin, either as such or as diluted with an unmodified olefin resin, has an MFR (JIS K-7210) usually of from 0.1 to 100 g/10 min, and preferably of from 0.5 to 20 g/10 min, from the viewpoint of moldability in extrusion, injection, vacuum forming and compression molding.

Articles which can be formed from the modified olefin resin include films, sheets, containers, and cases. These articles may be obtained by conventional processes, such as extrusion, injection molding, vacuum forming, and blow molding. The molded acid-graft polyolefin articles may have a laminate structure composed of the modified olefin resin and a thermoplastic resin, such as polyethylene, polypropylene, an ethylene-vinyl acetate copolymer, polyamide, polybutylene terephthalate, polyethylene terephthalate, polyphenylene sulfide, polyphenylene ether, polycarbonate, etc. The films or sheets may be subjected to stretching.

It is preferable that the olefin resin film or sheet on which an inorganic oxide layer is to be deposited is uniaxially or biaxially stretched. Stretching makes the surface of the film or sheet more smooth and reduces the maximum surface roughness, thereby improving adhesive strength to an inorganic oxide deposit film and minimizing any reduction in gas barrier properties of the resulting composite film after fabrication.

The article made from the modified olefin resin preferably has a Bekk's surface smoothness (JIS P-8119) of 20,000 sec or more, preferably from 40,000 to 100,000 sec, and a maximum surface roughness ($R_{max}$) (JIS B 0601-1982) of not more than 1 μm, preferably not more than 0.5 μm, and more preferably from 0.01 to 0.4 μm.

Such surface properties of the article can be provided by, for example, avoiding use of (or at least minimizing the amount of) compounding additives which would form fine projections on the surface of the molded article, such as nucleating agents (e.g., talc and silicon oxide) and lubricants (e.g., zinc stearate and calcium stearate) or by giving a mirror finish to the cavity wall of the mold with an aluminum-plated surface or to the die lip of an extrusion die.

The films of the invention usually have a thickness of from 5 to 200 μm. The sheets usually have a thickness of from 200 to 1,500 μm. Small containers or cases usually have a wall thickness of from 300 to 2,500 μm. Tanks or 20 l-volume chemical storage vessels usually have a wall thickness of from 1 to 10 mm.

If desired, the molded articles may be subjected to an oxidation treatment prior to being overcoated, such as a corona discharge treatment, an ozone treatment, a glow discharge treatment, a plasma treatment, or a treatment with a chemical.

It is preferable to first provide an anchor coat (also termed a "primer coat") on the surface of the molded article to improve the adhesion of the inorganic oxide deposite film, before application of the inorganic oxide deposite film.

Known anchoring agents, such as polyisocyanate compounds, polyurethanes, polyesters, polyethyleneimines, alkyl titanates, etc., can be used for formation of an anchor coat. Preferred anchoring agents are polyisocyanate compounds, polyurethanes, urethane prepolymers or mixtures thereof or reaction products thereof, and mixtures of a polyester polyol or a polyether polyol and a polyisocyanate compound. These anchoring agents are applied in an amount usually of from 0.01 to 0.5 g/m², and preferably of from 0.1 to 0.3 g/m², on a solid weight basis.

In the present invention, an inorganic oxide is deposited on the surface of the acid-modified polyolefin molded article or on an anchor coat provided thereon to form an inorganic oxide deposite film. Preferred oxygen permeabilities of the invention article are from 0.1 to 20 cc/m²·atm·day.

The inorganic oxide deposite film is formed of $SiO_x$, $SnO_x$, $ZnO_x$, $IrO_x$, etc. (where x is from 1 to 2) to a thickness of from 200 to 4,000 Å, preferably from 300 to 3,000 Å. The thickness of the inorganic oxide film is decided by transparency, deposition rate, gas barrier properties, and take-up properties of the film.

Deposition methods for applying the inorganic film include a method in which an inorganic oxide is deposited on the molded article made of the acid-grafted polyolefin in vacuo ($1\times10^{-3}$ to $1\times10^6$ Torr) in a vacuum deposition apparatus utilizing a high-frequency induction heating system (see JP-B-53-12953 incorporated herein by reference) and a method in which a gas stream containing an organosilicon compound, oxygen and an inert gas is generated in a vacuum deposition apparatus which has been evacuated and a plasma is then generated in the gas stream by a magnetron glow discharge to deposit $SiO_x$ on the molded article in the vacuum deposition apparatus (see JP-A-64-87772 and U.S. Pat. Nos. 4,557,946 and 4,599,678 all incorporated herein by reference). Additionally, various deposition methods which may be used in the preparation of the article of the present invention are described in KOGYO ZAIRYO, Vol. 38, No. 14, pp. 104–105 (Nov., 1990) incorporated herein by reference under the classifications of ion plating, high-frequency plasma CVD, electron beam (EB) deposition, and sputtering.

The present invention will now be illustrated in greater detail with reference to Examples, the present invention is not limited thereto. All the percents are by weight unless otherwise specified.

The maximum surface roughness ($R_{max}$) and the center-line average surface roughness ($R_a$) of the films prepared were measured with a three-dimensional center-line roughness meter "SE-3AK" and an analyzer "Model SPA-11" both manufactured by Kosaka Kenkyusho.

SYNTHESIS EXAMPLE

Preparation of Catalyst-on-Carrier:

To a flask thoroughly purged with nitrogen was added 100 ml of dehydrated and deoxidized n-heptane, 0.1 mol of magnesium chloride and 0.20 mol of titanium tetrabutoxide, followed by allowing the mixture to react at 100° C. for 2 hours. The temperature was lowered to 40° C., and 15 ml of methyl hydrogen polysiloxane was added thereto and reacted for 3 hours. After completion of the reaction, the solid component produced was washed with n-heptane. Composition analysis on an aliquot of the solid component revealed a Ti content of 15.2% and an Mg content of 4.2%.

Into a flask thoroughly purged with nitrogen was charged 100 ml of dehydrated and deoxidized n-heptane, and 0.03 mol, converted to an Mg atom, of the above-prepared solid component was added thereto. To the flask was further introduced 0.05 mol of silicon tetrachloride at 30° C. over a period of 15 minutes, and the mixture was allowed to react at 90° C. for 2 hours. After completion of the reaction, the reaction mixture was washed with purified n-heptane. A mixture of 25 ml of n-heptane and 0.004 mol of o-$C_6H_4$(COCl)$_2$ was added to the reaction mixture at 50° C., and 0.05 mol of silicon tetrachloride was then added thereto, followed by allowing the mixture to react at 90° C. for 2 hours. After completion of the reaction, the reaction mixture was washed with n-heptane to obtain a catalyst component having a Ti content of 2.05%.

Preparation of Olefin Copolymer (1):

In a 10 l autoclave thoroughly purged with propylene were charged 3.3 l of n-heptane, and 1.0 g of triethylaluminum, 0.44 g of diphenyldimethoxysilane, and 0.7 g of the above-prepared catalyst-on-carrier were added thereto in this order. To the autoclave was fed 800 Nml of hydrogen, and propylene was then introduced under pressure to a final inner pressure of 0.5 kg/cm²G. The mixture was stirred at 50° C. at that pressure. Thereafter, 700 ml of 7-methyl-1,6-octadiene was added thereto, the temperature was elevated while introducing propylene under pressure to a final inner pressure of 5.5 kg/cm²G, and the mixture was kept at 65° C. under that pressure for 5 hours to conduct polymerization. The catalyst was inactivated with n-butanol, the residual catalyst was extracted with water, and the copolymer was recovered by centrifugation and dried to obtain 1940 g a dry powder having a bulk density of 0.50 g/cc and an amorphous polymer content of 54 g. The copolymer had an MFR (measured at 230° C., 2.16 kg load; hereinafter the same) of 2 g/10 min, a density of 0.895 g/cm$^3$, a crystallinity of 42%, and a modulus of elasticity of 8,100 kg/cm$^2$. The 7-methyl-1,6-octadiene unit concentration was 2.7 mol % as analyzed by H$^1$-NMR. The diene monomer unit formed no chain and had a 1,2-addition structure.

Preparation of Olefin Copolymer (2):

A random copolymer comprising 96.7 mol % of propylene and 3.3 mol % of 1,4-hexadiene was prepared in the same manner as for olefin copolymer (1), except for replacing 7-methyl-1,6-octadiene with 1,4-hexadiene. Olefin copolymer (2) had an MFR of 2 g/10 min, a density of 0.903 g/cm$^3$, a crystallinity of 36%, and a modulus of elasticity of 5,500 kg/cm$^2$.

Preparation of Modified Olefin Resin (1):

To 100 parts of a propylene homopolymer powder (MFR: 2 g/10 min; density: 0.905 g/cm$^3$) were added 0.8 part of benzoyl peroxide, 1.2 parts of maleic anhydride, and 0.2 parts of silicon oxide, and the mixture was mixed in a Henschel mixer. The mixture was extruded into strands from an extruder at a temperature of 220° C., cooled with water, and cut to pellets.

The resulting pellets were dissolved in boiling xylene and re-precipitated with a large quantity of acetone. The solid was analyzed by infrared spectrophotometry. As a result, the grafted maleic anhydride unit concentration in the modified polypropylene was 0.7%.

Preparation of Modified Olefin Resin (2):

To 100 parts of a propylene homopolymer powder (MFR: 2 g/10 min; density: 0.905 g/cm$^3$) were added 0.8 part of benzoyl peroxide and 1.2 parts of maleic anhydride, and the mixture was mixed in a Henschel mixer. The mixture was extruded into strands from an extruder at a temperature of 220° C., cooled with water, and cut to pellets.

The grafted maleic anhydride unit concentration in the modified polypropylene was 0.7% as measured in the same manner as described above.

Preparation of Modified Olefin Resin (3):

To 100 parts of an ethylene-propylene random copolymer powder (ethylene content: 5%; MFR: 1 g/10 min; density:0.89 g/cm$^3$) were added 0.8 part of benzoyl peroxide and 1.2 parts of maleic anhydride, and the mixture was mixed and extruded to obtain pellets in the same manner as for modified olefin resin (1).

The grafted maleic anhydride unit concentration in the modified polypropylene was 0.9% as measured in the same manner as described above.

Preparation of Modified Olefin Resin (4):

A graft copolymer having an MFR of 2.2 g/10 min and a maleic anhydride unit concentration of 1.0% was prepared in the same manner as for modified olefin resin (1), except for replacing the propylene homopolymer with olefin copolymer (1) (propylene/7-methyl-1,6-octadiene copolymer).

Preparation of Modified Olefin Resin (5):

A graft copolymer having an MFR of 2.1 g/10 min and a maleic anhydride unit concentration of 0.8% was prepared in the same manner as for modified olefin resin (1), except for replacing the propylene homopolymer with olefin copolymer (2) (propylene/1,4-hexadiene copolymer).

Preparation of Modified Olefin Resin (6):

To 100 parts of a linear low-density polyethylene (MFR: 2 g/10 min; density: 0.920 g/cm$^3$; ethylene content: 91.0%; hexene content: 9.0%) were added 0.04 part of 2,5-dimethyl-2,5-di(t-butylperoxy)hexane and 2 parts of maleic anhydride, and the mixture was mixed in a Henschel mixer. The mixture was extruded into strands from an extruder at a temperature of 180° C., cooled with water, and cut to pellets.

The grafted maleic anhydride unit concentration in the modified polyethylene was 1.9% as measured in the same manner as described above.

EXAMPLE 1

Modified olefin resin (1) was melt-kneaded in an extruder and extruded through a T-die at 238° C. The extruded sheet was cooled on a metallic roll to obtain a 1 mm thick sheet. The sheet was heated to 120° C. and 5-fold stretched in the machine direction by making use of a difference in peripheral speed of rolls.

The stretched film was then re-heated to 157° C. in a tentering oven and 10-fold stretched in the transverse direction by means of a tenter frame. The resulting biaxially stretched film was subjected to annealing at 163° C. and then to a corona discharge treatment to obtain a biaxially stretched film having a thickness of 20 μm.

The biaxially stretched film had a surface smoothness of 40,200 sec, a maximum surface roughness ($R_{max}$) of 1.2 μm, and a center-line average surface roughness ($R_a$) of 0.35 μm.

The biaxially stretched film was placed in a plasma deposition apparatus. After evacuating the apparatus to 1×10$^{-6}$ Torr, a mixed gas consisting of 3 parts by volume of hexamethyldisiloxane, 3 parts by volume of oxygen, 20 parts by volume of helium, and 13 parts by volume of argon was introduced into the apparatus and subjected to a glow discharge by a non-equilibrium magnetron to generate plasma. A SiO$_2$ thin layer was thus deposited on the biaxially stretched film. The deposited SiO$_2$ had a thickness of from 300 to 360 Å and a particle size of from 100 to 300 Å (see FIG. 1). The glow discharge conditions were set so that the SiO$_2$-deposited film would have an oxygen permeability of 5.0 cc/m$^2$•atm•day as measured in accordance with JIS 1707-35.

EXAMPLE 2

An SiO$_2$-deposited biaxially stretched film was prepared in the same manner as in Example 1, except for replacing modified olefin resin (1) with modified olefin resin (2).

The biaxially stretched film before SiO$_2$ deposition had a surface smoothness of 50,800 sec, a maximum surface roughness ($R_{max}$) of 0.48 μm, and a center-line average surface roughness ($R_a$) of 0.32 μm. The deposited SiO$_2$ had a thickness of from 180 to 260 Å.

EXAMPLE 3

An SiO$_2$-deposited biaxially stretched film was prepared in the same manner as in Example 1, except for replacing modified olefin resin (1) with 5 parts of modified olefin resin (1) diluted with 95 parts of unmodified polypropylene (MFR: 0.8 g/10 min; density: 0.950 g/cm$^3$), the diluted olefin resin material having a maleic acid unit concentration of 0.035%.

EXAMPLE 4

Modified olefin resin (3) and the same unmodified polypropylene as used in Example 3 were melt-kneaded in separate extruders, fed to one die, laminated together in the die, and co-extruded to obtain a 1 mm thick sheet composed of a 0.1 mm thick modified olefin resin (3) layer and a 0.9 mm thick unmodified polypropylene layer.

The sheet was stretched in the same manner as in Example 1 to obtain a biaxially stretched film having a thickness of 20 µm.

The modified olefin resin (3) side of the laminate film was subjected to a corona discharge treatment, and $SiO_2$ was deposited thereon in the same manner as in Example 1 to prepare an $SiO_2$-deposited biaxially stretched film.

COMPARATIVE EXAMPLE 1

An $SiO_2$-deposited biaxially stretched film was prepared in the same manner as in Example 1, except for replacing modified olefin resin (1) with unmodified polypropylene (MFR: 0.8 g/10 min; density: 0.905 g/cm$^3$). The deposited $SiO_2$ had a thickness of from 450 to 510 Å.

COMPARATIVE EXAMPLE 2

An $SiO_2$-deposited biaxially stretched film was prepared in the same manner as in Example 1, except for replacing modified olefin resin (1) with 1 part of modified olefin resin (1) diluted with 99 parts of unmodified polypropylene (MFR: 0.8 g/10 min; density: 0.905 g/cm$^3$), the diluted olefin resin material having a maleic acid unit concentration of 0.007%.

EXAMPLE 5

Modified olefin resin (6) was melted in an extruder and extruded into a cylinder through a blown-film die at 160° C., and the parison was inflated with air to a blow-up ratio of 2. The blown film was subjected to a corona discharge treatment to obtain a modified polyethylene film having a thickness of 40 µm.

An SiO2 was deposited on the modified polyethylene film in the same manner as in Example 1.

COMPARATIVE EXAMPLE 3

An $SiO_2$-deposited biaxially stretched film was prepared in the same manner as in Example 5, except for replacing modified olefin resin (6) with unmodified linear low-density polyethylene (MFR: 2 g/10 min; density: 0.920 g/cm$^3$).

In all the foregoing Examples, the glow discharge conditions were varied so that the $SiO_2$-deposited film would have an oxygen permeability of 5.0 cc/m$^2$·atm·day.

Each of the $SiO_2$-deposited biaxially stretched films obtained in Examples 1 to 5 and Comparative Examples 1 to 3 was evaluated as follows. The results of evaluation are shown in Table 1 below.

1) Permeation Change with External Stress:

A repeated torsion tester "Gelbo Flex Tester" manufactured by Meiritsu Keiki K. K. was used. The film was rolled into a cylindrical form, and the ends of the cylinder were fixed to the clamps of the tester. After torsion of ±90° was given to the cylinder ten times, an oxygen permeability was determined.

2) Permeation Chance on Fabrication:

Low-density polyethylene having a melt index of 5 g/10 min and a density of 0.922 g/cm$^3$ was extruded from a T- die at a resin temperature of 320° C. into a 20 µm thick film and laminated on the $SiO_2$-deposited side of each of the films by means of a laminator. The oxygen permeability of the resulting laminated film was measured.

TABLE 1

| | Oxygen Permeability (cc/m$^2$ · atm · day) | | | |
|---|---|---|---|---|
| Example No. | Initial | After External Stress | After Laminating | $SiO_2$ thickness (Å) |
| Example 1 | 5.0 | 9.8 | 5.5 | 300–360 |
| Example 2 | 5.0 | 5.2 | 5.0 | 180–260 |
| Example 3 | 5.0 | 12.5 | 6.0 | —* |
| Example 4 | 5.0 | 10.2 | 5.8 | — |
| Example 5 | 5.0 | 13.2 | 7.0 | — |
| Compar. Example 1 | 5.0 | 270 | 14.3 | 450–510 |
| Compar. Example 2 | 5.0 | 240 | 13.6 | — |
| Compar. Example 3 | 5.0 | 307 | 15.8 | — |

Note:
*Unmeasured

EXAMPLE 6

A biaxially stretched film of modified olefin resin (1) (annealed and corona discharge-treated; thickness: 20 µm) was prepared in the same manner as in Example 1.

The corona discharge-treated side of the film was coated with a polyurethane type anchoring agent "Titabond T120" (a product of Nippon Soda Co., Ltd; a mixture consisting of 7% of polyisocyanate polyether polyol; 0.6% of a hardening agent; and 92.4% of ethyl acetate) by roll coating. The solvent was removed by drying with a drier to form an anchor coat.

The biaxially stretched film having an anchor coat was placed in a plasma deposition apparatus, and $SiO_2$ was deposited on the anchor coat in the same manner as in Example 1. The glow discharge conditions were set so that the $SiO_2$-deposited film would have an oxygen permeability of 5.0 cc/m$^2$·atm·day as measured in accordance with JIS 1707-35.

EXAMPLE 7

An $SiO_2$-deposited biaxially stretched film was prepared in the same manner as in Example 6, except for replacing modified olefin resin (1) with 5 parts of modified olefin resin (1) diluted with 95 parts of unmodified polypropylene (MFR: 0.8 g/10 min; density: 0.905 g/cm$^3$), the diluted olefin resin material having a maleic acid unit concentration of 0.35%.

EXAMPLE 8

Modified olefin resin (3) and the same unmodified polypropylene as used in Example 7 were melt-kneaded in separate extruders, fed to one die, laminated together in the die, and co-extruded to obtain a 1 mm thick sheet composed of 0.1 mm thick modified olefin resin (3) layer and a 0.9 mm thick unmodified polypropylene layer.

The sheet was stretched in the same manner as in Example 1 to obtain a biaxially stretched film having a thickness of 20 µm.

The modified olefin resin (3) side of the laminate film was subjected to a corona discharge treatment. Then an anchor coat was formed on this side in the same manner as in Example 6, and $SiO_2$ was deposited thereon in the same manner as in Example 6.

COMPARATIVE EXAMPLE 4

An $SiO_2$-deposited biaxially stretched polypropylene film was prepared in the same manner as in Example 6, except for replacing modified olefin resin (1) with unmodified propylene homopolymer (MFR: 0.8 g/10 min; density: 0.905 g/cm$^3$).

evaluated in the same manner as in Example 1. The results obtained are shown in Table 2 below.

TABLE 2

| Example No. | SiO$_2$-Deposited Film | | | | Oxygen Permeability of LDPE-Laminated Film* | |
|---|---|---|---|---|---|---|
| | Base Film Resin | Maleic Anhydride Unit Concentration (%) | Anchor Coat | SiO$_2$ thickness (Å) | Oxygen Permeability (cc/m$^2$ · atm · day) | Initial (cc/m$^2$ · atm · day) | After External Stress (cc/m$^2$ · atm · day) |
| Example 6 | Modified olefin resin (1) | 0.7 | provided | 280–330 | 5.0 | 5.5 | 10.8 |
| Example 7 | " | 0.35 | " | —** | 5.0 | 5.8 | 11.7 |
| Example 8 | Modified olefin resin (3)/Unmodified polypropylene laminate | 0.9 | " | — | 5.0 | 5.5 | 11.0 |
| Compar. Example 4 | Unmodified polypropylene | 0 | " | — | 5.0 | 11.2 | 34.3 |
| Example 9 | Modified olefin resin (4) | 1.0 | " | 250–300 | 5.0 | 5.0 | 6.5 |
| Example 10 | Modified olefin resin (5) | 0.8 | " | — | 5.0 | 5.0 | 7.8 |
| Example 11 | Modified olefin resin (6) | 1.9 | " | — | 5.0 | 9.2 | 18.5 |
| Compar. Example 5 | Unmodified polyethylene | 0 | " | — | 5.0 | 14.2 | 45.8 |

Note:
*SiO$_2$-deposited film having laminated thereon a low-density polyethylene film.
**Unmeasured

EXAMPLE 9

An SiO$_2$-deposited biaxially stretched polypropylene film was prepared in the same manner as in Example 6, except for replacing modified olefin resin (1) with modified olefin resin (4).

EXAMPLE 10

An SiO$_2$-deposited biaxially stretched polypropylene film was prepared in the same manner as in Example 6, except for replacing modified olefin resin (1) with modified olefin resin (5).

EXAMPLE 11

Modified olefin resin (6) was melted in an extruder and extruded into a cylinder through a blown-film die at 160° C., and the parison was inflated with air to a blow-up ratio of 2. The blown film was subjected to a corona discharge treatment to obtain a modified polyethylene film having a thickness of 40 μm.

An anchor coat was formed on the corona discharge-treated side in the same manner as in Example 6, and SiO$_2$ was deposited on the anchor coat in the same manner as in Example 6.

COMPARATIVE EXAMPLE 5

An SiO$_2$-deposited polyethylene film was prepared in the same manner as in Example 11, except for replacing modified olefin resin (6) with unmodified linear low-density polyethylene (MFR: 2 g/10 min; density: 0.920 g/cm$^3$).

Each of the SiO$_2$-deposited olefin resin films obtained in Examples 6 to 11 and Comparative Examples 4 and 5 was As described and demonstrated above, the modified olefin resin-based article having deposited thereon an inorganic oxide film suffers from no reduction in gas barrier properties even when heat or stress is applied thereto. Accordingly, it is more useful as a wrapping or packaging material in the production of pouch-packed foods, IC packages, etc.

While the invention has been described in detail and with reference to specific examples thereof, it will be apparent to one skilled in the art that various changes and modifications can be made therein without departing from the spirit and scope thereof.

What is claimed is:

1. An olefin resin-based article having good gas barrier properties, consisting of an α-β-ethylenically unsaturated carboxylic anhydride-grafted polyolefin having formed thereon an anchor coat, and, on said anchor coat, a 200–4,000 angstrom thick silicon oxide deposit film, wherein the α-β-ethylenically unsaturated carboxylic anhydride-grafted polyolefin is a maleic anhydride-grafted polypropylene resin, the concentration of maleic anhydride units in said α-β-ethylenically unsaturated anhydride-grafted polyolefin is from 0.01 to 10% by weight and wherein said olefin resin-based article is a stretched film which has been stretched before formation of the silicon oxide deposit thereon.

2. An olefin resin-based article as claimed in claim 1, wherein the olefin resin-based article before formation of the silicon oxide deposit film has a Bekk's surface smoothness of from 20,000 to 100,000 sec and a maximum surface roughness ($R_{max}$) of not more than 0.5 μm.

3. An olefin resin-based article as claimed in claim 1, wherein said anchor coat is present in an amount of from 0.01 to 0.5 g/m$^2$ on a solid weight basis.

4. The olefin resin-based article as claimed in claim 1, wherein said anchor coat comprises a polyisocyanate, polyurethane, polyester, polyethylene-imine or alkyl titanate.

5. The olefin resin-based article as claimed in claim 1, wherein said anchor coat comprises a polyisocyanate compound, a polyurethane, a urethane prepolymer, mixtures of polyisocyanate compounds, polyurethanes and urethane prepolymers or reaction products of polyisocyanate compounds, polyurethanes and urethane prepolymers.

6. The olefin resin-based article as claimed in claim 1, wherein said anchor coat comprises a mixture of a polyester polyol or a polyether polyol and a polyisocyanate compound.

7. The olefin resin-based article as claimed in claim 4, wherein said anchor coat is present in an amount of from 0.01 to 0.5 g/m² on a solid weight basis.

8. The olefin resin-based article as claimed in claim 4, wherein said anchor coat is present in an amount of from 0.1 to 0.3 g/m² on a solid weight basis.

9. The olefin resin-based article as claimed in claim 5, wherein said anchor coat is present in an amount of from 0.01 to 0.5 g/m² on a solid weight basis.

10. The olefin resin-based article as claimed in claim 5, wherein said anchor coat is present in an amount of from 0.1 to 0.3 g/m² on a solid weight basis.

11. The olefin resin-based article as claimed in claim 6, wherein said anchor coat is present in an amount of from 0.01 to 0.5 g/m² on a solid weight basis.

12. The olefin resin-based article as claimed in claim 6, wherein said anchor coat is present in an amount of from 0.1 to 0. 3 g/m² on a solid weight basis.

13. An olefin resin-based article having good gas barrier properties, consisting of an α-β-ethylenically unsaturated carboxylic anhydride-grafted polyolefin having formed thereon an anchor coat, and, on said anchor coat, a 200–4,000 angstrom thick silicon oxide deposit film, wherein the α-β-ethylenically unsaturated carboxylic anhydride-grafted polyolefin is a maleic anhydride-grafted polypropylene resin, the concentration of maleic anhydride units in said α-β-ethylenically unsaturated anhydride-grafted polyolefin is from 0.01 to 10% by weight and wherein said α-β-ethylenically unsaturated carboxylic anhydride-grafted polyolefin is a stretched film which has been stretched before formation of the silicon oxide deposit thereon.

14. An olefin resin-based article as claimed in claim 13, wherein the olefin resin-based article before formation of the silicon oxide deposit film has a Bekk's surface smoothness of from 20,000–100,000 sec. and a maximum surface roughness ($R_{max}$) of not more than 0.5 μm.

15. An olefin resin-based article as claimed in claim 13, wherein said anchor coat is present in an amount of from 0.01 to 0.5 g/m² on a solid weight basis.

16. The olefin resin-based article as claimed in claim 13, wherein said anchor coat comprises a polyisocyanate, polyurethane, polyester, polyethylene-imine or alkyl titanate.

17. The olefin resin-based article as claimed in claim 13, wherein said anchor coat comprises a polyisocyanate compound, a polyurethane, a urethane prepolymer, mixtures of polyisocyanate compounds, polyurethanes and urethane prepolymers or reaction products of polyisocyanate compounds, polyurethanes and urethane prepolymers.

18. The olefin resin-based article as claimed in claim 13, wherein said anchor coat comprises a mixture of a polyester polyol or a polyether polyol and a polyisocyanate compound.

19. The olefin resin-based article as claimed in claim 16, wherein said anchor coat is present in an amount of from 0.01 to 0.5 g/m² on a solid weight basis.

20. The olefin resin-based article as claimed in claim 16, wherein said anchor coat is present in an amount of from 0.01 to 0.3 g/m² on a solid weight basis.

21. The olefin resin-based article as claimed in claim 17, wherein said anchor coat is present in an amount of from 0.01 to 0.5 g/m² on a solid weight basis.

22. The olefin resin-based article as claimed in claim 17, wherein said anchor coat is present in an amount of from 0.01 to 0.3 g/m² on a solid weight basis.

23. The olefin resin-based article as claimed in claim 18, wherein said anchor coat is present in an amount of from 0.01 to 0.5 g/m² on a solid weight basis.

24. The olefin resin-based article as claimed in claim 18, wherein said anchor coat is present in an amount of from 0.1 to 0.3 g/m² on a solid weight basis.

* * * * *